Patented June 9, 1925.

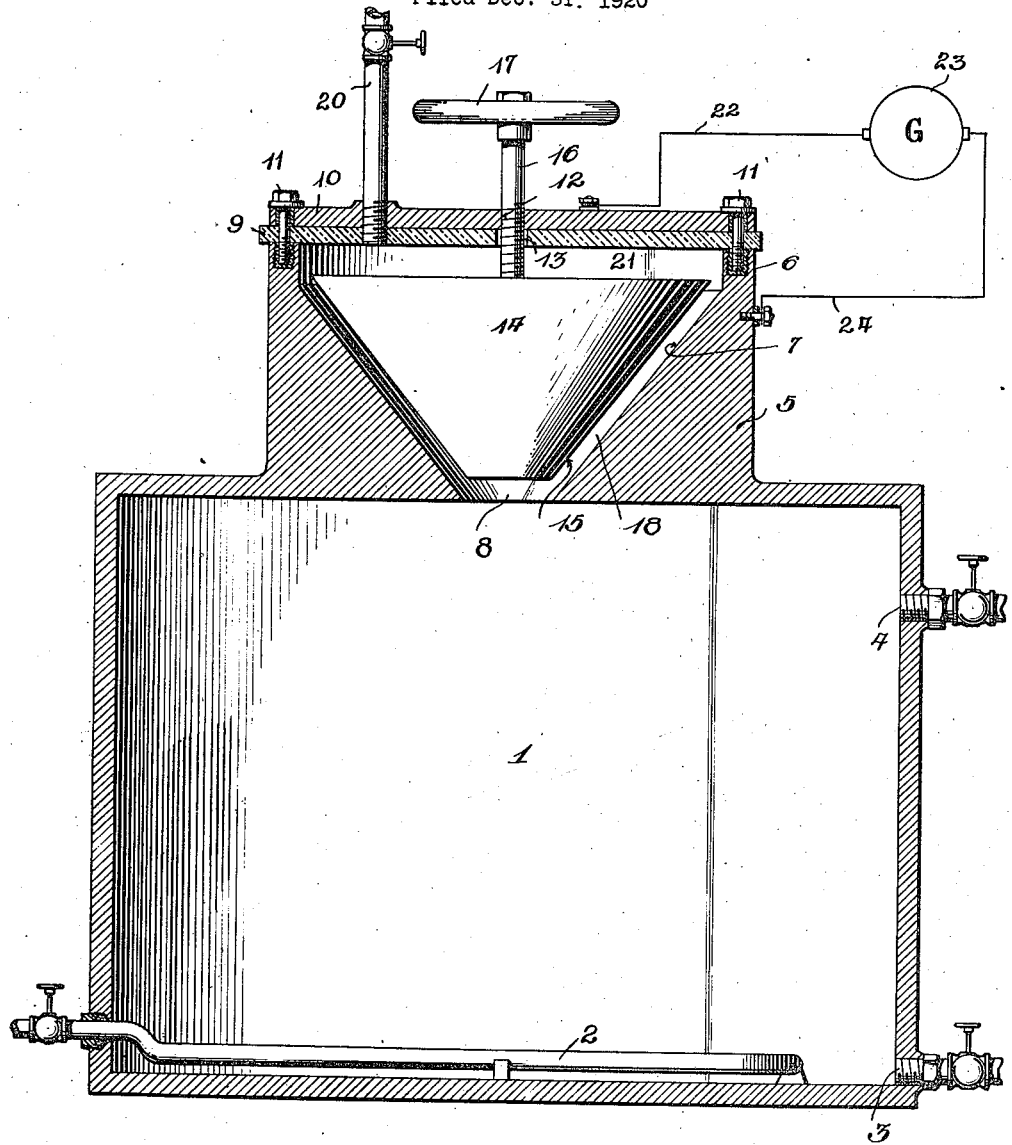

1,540,929

UNITED STATES PATENT OFFICE.

S PHILIP COBLENTZ, OF BAYTOWN, AND STEWART P. COLEMAN, OF CORPUS CHRISTI, TEXAS, ASSIGNORS TO HUMBLE OIL AND REFINING COMPANY, A CORPORATION OF TEXAS.

TREATING OF HYDROCARBON OIL.

Application filed December 31, 1920. Serial No. 434,393.

*To all whom it may concern:*

Be it known that we, S PHILIP COBLENTZ, a citizen of the United States, residing at Baytown, in the county of Harris and State of Texas, and STEWART P. COLEMAN, a citizen of the United States, residing at Corpus Christi, in the county of Nueces and State of Texas, have invented new and useful Improvements in the Treating of Hydrocarbon Oil, of which the following is a specification.

This invention relates to processes for purifying oils and is more particularly related to the separation and removal of impurities such as unsaturated compounds, soaps, sulfonates, resins, oxidation products and those tending to produce emulsions, and will be fully understood from the following description thereof.

The removal by the present method of the impurities referred to tends to impart greater brilliancy and a better color to the oils and to minimize the degree of bloom in the oil.

Referring to the accompanying drawing, the figure illustrates a preferred form of apparatus used in carrying out several steps of the present invention, the parts being shown in section for the purpose of illustration.

A suitable agitator (not shown) is charged with a quantity of crude or partly refined petroleum oil and the oil then blown with any suitable acid, such as 66° Bé. $H_2SO_4$, by air pressure or mechanical agitation, after which agitation the liquid is allowed to become still and the weak acid sludge thrown down is drawn off in the usual manner.

After this sludge removal a second acid dump of greater proportions than the first is blown in and the resulting liquid agitated for a relatively longer period than the first agitation above mentioned.

A second period of settling is then permitted of greater length than the original settling and the acid sludge is again drawn.

Following this step a solution of a salt of an alkali metal such as sodium chloride or other suitable salt in water is added to the resultant oil and residual acid in the agitator and the whole agitated by an air or steam blast until an emulsion is formed, showing that an intimate mechanical mixture or chemical solution has been formed. The addition of the salt solution to the oil is for the purpose of forming an emulsion of suitable acidity or alkalinity to insure the presence of a liquid of relatively great electrical conductivity in order to facilitate the cataphoretic action to which the emulsion is subsequently subjected.

Agitation is now stopped and the batch allowed to settle when the remaining acid sludge will precipitate rapidly and the supernatant oil emulsion may be pumped off to receive treatment in the apparatus hereinafter described.

1 designates a settling chamber of usual construction having a steam coil 2 in the bottom thereof. A water and sludge outlet 3 is provided near the base of the chamber and an oil outlet 4 is located adjacent the upper portion. The upper portion of the settling chamber 1 is formed into a cylindrical extension 5 having an annular shoulder 6, the interior of the extension 5 being formed as a cone-shaped seat 7 opening into the chamber 1 through the medium of a port 8. Resting upon the shoulder 6 is a gasket 9 formed of fibre or other suitable insulating material and adapted to insulate the cover 10 from the said shoulder 6 and to which said cover is secured by any suitable means, as for example by a plurality of stay bolts 11 also suitably insulated to prevent electrical contact between the cover 10 and the shoulder 6. A central threaded aperture 12 extends through the cover 6 and coincides with an opening 13 in the gasket 9. A member 14 in the shape of a cone and of such a configuration to present its exterior surface 15 in parallelism to the seat 7 is supported in position by a threaded member 16 engaging the opening 12. This member 14 is provided with a hand wheel 17 by means of which vertical adjustment of the member 14 may be effected in order to vary the distance between the members 14 and 7, so that with emulsions or liquids of different conductivity the thickness of the film may be varied to insure a substantially constant current there-through. This variation of film thickness may be effected by the manipulation of the hand wheel 17 to raise or lower the cone 14, as will be obvious.

A feed pipe 20 communicates with a supplemental chamber 21 above the seat 7 as shown. A suitable conductor 22 extends from a source of electric potential, diagrammatically illustrated at 23, to electrical contact with the cover 10, as does a similar conductor 24 to the extension 5, the member 14 thereby serving as one pole, and the seat 7 as the other pole of an electric circuit.

The emulsion above referred to is fed into the pipe 20 and passes between the cone 14 and its seat 7 and is subjected to an electric current of high potential. It has been found preferable to employ a direct current of from 50 to 600 volts and 3 to 5 amperes. It will be understood that the voltage and amperage used will depend upon the character of the oil and of the emulsion which is being treated.

The emulsion when subjected to an electrical current as above described is thereby deemulsified.

The treated liquid then passes into the settling pot, where the oil and water or water solution stratify and the oil may be drawn off. The water or water solution is also simultaneously removed through the other outlet 3.

The following is an example of the process of this invention.

An agitator is charged with one thousand barrels (50-gallon) of untreated 150° viscosity Saybolt Goose Creek lubricating oil distillate and such distillate immediately acid blown by air pressure with 66° Bé. sulfuric acid in the ratio of 2.5 pounds of acid for each barrel of distillate or, in other words, 1.25 tons for each 1,000 barrel batch. Compressed air is used to agitate the entire contents for approximately five minutes, after which a settling is permitted for about half an hour and the weak acid sludge then drawn off.

The main acid dump of fifteen pounds of acid for each fifty gallons of distillate or 7.5 tons for a thousand barrel batch, is then added, after which the material is again agitated for half an hour and allowed to settle from fifteen to thirty minutes and the acid sludge drawn.

Two hundred barrels of sodium chloride solution of a strength of one to two pounds of salt (sodium chloride) for each fifty gallons of oil under treatment is now added and the entire batch agitated by steam or air for five to ten minutes.

This addition forms an emulsion which is allowed to settle for half an hour and is then pumped to the electric treatment apparatus above described. The cone 14 has an altitude of ten inches and a base of fifteen inches, the emulsion passing through the space 18 in a one quarter inch film and being subjected to a direct current of ninety volts. The rate of flow is one barrel in fifteen minutes.

The oil is drawn off through the outlet 4 and blown bright at a temperature of 190° after which it is passed through a small barrel filter using floridan as a filtering medium.

This process gives a yield of one hundred per cent over similar distillates treated with acid, neutralized with soda and separated in the usual way.

While a specific application of this process has been described it is not intended to limit the carrying out of such process to the example given, and the following claims are to be construed as embodying the process as broadly as the prior art will permit.

What is claimed as new is:

1. The process of treating a hydrocarbon oil which consists in subjecting the oil to treatment with acid, separating the acid sludge, producing an emulsion of the oil with a salt solution and subjecting said emulsion to cataphoretic action.

2. The process of treating a hydrocarbon oil which consists in subjecting the oil to treatment with acid, separating the acid sludge, producing an emulsion of the oil with a soultion of an alkali metal salt and subjecting said emulsion to cataphoretic action.

3. The process of treating a hydrocarbon oil which consists in subjecting the oil to treatment with sulfuric acid, separating the acid sludge, producing an emulsion of the oil with a salt solution and subjecting said emulsion to cataphoretic action.

4. The process of treating a hydrocarbon oil which consists in subjecting the oil to treatment with acid, separating the acid sludge, producing an emulsion of the oil with a sodium chloride solution and subjecting said emulsion to cataphoretic action.

5. The process of treating a hydrocarbon oil which consists in subjecting the oil to treatment with 66° Baumé sulfuric acid, separating the acid sludge, producing an emulsion of the oil with a salt solution and subjecting said emulsion to cataphoretic action.

6. The process of treating a hydrocarbon oil which consists in subjecting the oil to treatment with acid, separating the acid sludge, producing an emulsion of the oil with a sodium salt solution of approximately two pounds of such salt to each fifty gallons of oil and subjecting such emulsion to cataphoretic action.

7. The process of treating a hydrocarbon oil which consists in subjecting the oil to treatment with 66° Baumé sulfuric acid in the proportion of approximately seventeen and one half pounds of acid for each fifty gallons of oil, separating the acid sludge, producing an emulsion of the oil with a salt solution and subjecting said emulsion to cataphoretic action.

S PHILIP COBLENTZ.
STEWART P. COLEMAN.